July 16, 1946.  A. C. RUGE  2,403,951
VARIABLE RESISTOR
Filed July 7, 1944
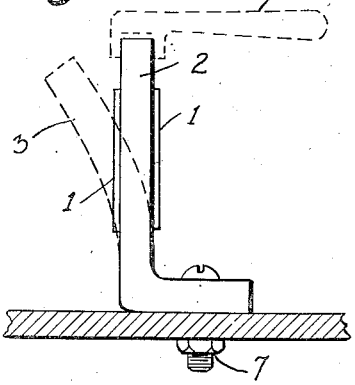
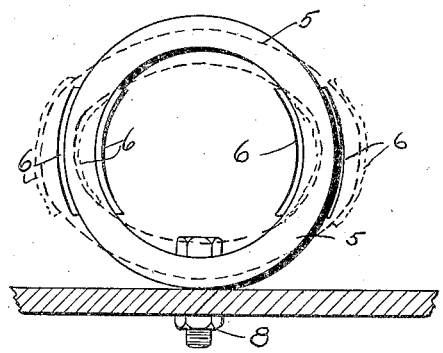
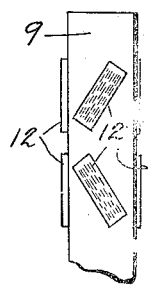
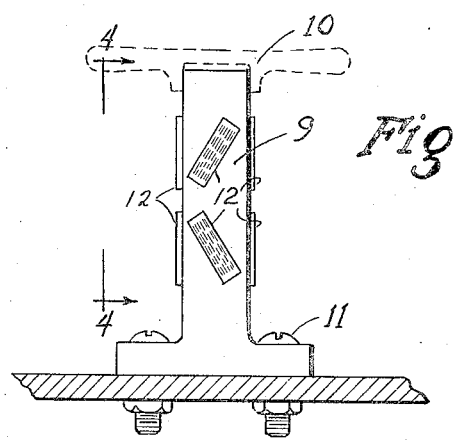
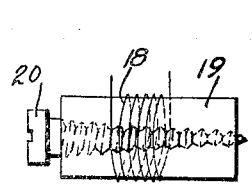
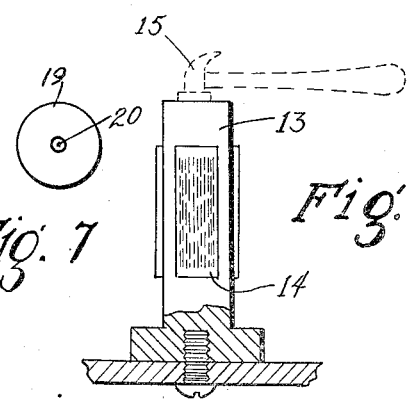
INVENTOR
Arthur C. Ruge
BY
ATTORNEY Patented July 16, 1946

2,403,951

UNITED STATES PATENT OFFICE 2,403,951

VARIABLE RESISTOR

Arthur C. Ruge, Cambridge, Mass., assignor to The Baldwin Locomotive Works, a corporation of Pennsylvania Application July 7, 1944, Serial No. 543,765

10 Claims. (Cl. 201—63)

This invention relates to adjustable resistors for electric circuits and it is an object of my invention to provide an improved resistor that can be quickly and very easily adjusted to exact values with an infinitely fine variation and which is extremely simple and economical in construction, operation and maintenance.

Other objects and advantages will be more apparent to those skilled in the art from the following description of the accompanying drawing in which:

Figs. 1 and 2 are side elevations of two forms of adjustable resistors employing a bending action;

Fig. 3 is another modification employing a torsional action;

Fig. 4 is a side view of Fig. 3 looked at in the direction of line 4—4 of Fig. 3;

Fig. 5 is a further modification in which a direct axial stress is employed to effect adjustment of the resistance;

Fig. 6 is a side view of a further modification employing an expanding strain; and Fig. 7 is a right hand end view of Fig. 6.

In the particular embodiments of the invention disclosed herein for purposes of illustration I employ an impedance element specifically in the form of a resistance wire bonded throughout its effective length to a member whose strain can be varied, thereby imparting a similar strain to the wire whose electrical resistance is accordingly varied in accordance with changes in strain of the member. This type of strain resistance element, as well as its material and the bonding cements, is disclosed in Simmons Patent 2,292,549 and in my Patent 2,350,972, and the use of such wire for resistor purposes is disclosed in my Patent 2,321,322. In my present invention I accomplish my improved results by mounting the wire strain gage 1 upon a suitable plastically deformable material 2 which has a certain amount of permanent set each time it is deformed. This material may be lead, soft copper, or plastics such as highly plasticized Celluloid or some composite laminated material such as the foregoing deformable metals sandwiched between plastic sheets such as Celluloid. The gage is positioned preferably in the direction of maximum strain which in the case of Fig. 1 would be lengthwise of a cantilever type member 2 whereby when it may be bent to any desired dotted line position 3 to cause the resistance to vary. A suitable tool, wrench or other device 4 may be employed if desired to grasp the upper end of the member 2 to bend it to produce the amount of resistance change required. The gage is of course connected in any suitable circuit (not shown) where precision resistors are needed.

In the form shown in Fig. 2 a plastic ring 5 has gages 6 mounted thereon at any suitable points whereby upon manually pinching the ring or lightly tapping it with a hammer the ring can be deformed into an elliptical or other shape to increase the strain on the gages with consequent change in resistance. If desired, the members 2 and 5 can be secured to a stationary base by screws 7 and 8 thereby causing the deformable material to function not only as a self-supporting bracket for the wire gages but also as a self-setting adjusting element which requires no external means to maintain it in a newly set position.

As shown in Figs. 3 and 4 a plastic member 9 may be subjected to torsion by gripping its upper end with a pair of pliers or wrench 10 and merely twisting the member. The lower end of the member may, if desired, be secured in position by screws 11. The strain gages 12 are preferably placed upon the sides of the member at an angle to the vertical axis thereby to be subjected to maximum strain in response to torsional adjustments of the member 9 although the gages may be positioned longitudinally.

As shown in Fig. 5, the gage supporting member 13 may have vertically extended gages 14 placed at any number of positions around the circumference whereby the resistance of the gages is changed by imposing a direct axial load upon member 13. This load may be imposed by a hammer 15 which can lightly tap the member 13 if a very small resistance adjustment is desired or the member 13 may hit more heavily if a large adjustment is desired.

In Fig. 6, a gage wire 18 is wrapped around and bonded to the surface of a cylinder 19 of plastically deformable material which can be expanded by a tapered screw, such as a simple wood screw, extending axially through the cylinder, thereby to strain the bonded wire and increase its resistance.

In all the forms shown, gages may be mounted on opposite sides of the plastically deformable members or in other suitable positions so that one is in compression and the other in tension. In this case, the two sets of gages may be, for example, connected in the arms of a bridge or other circuit so as to have an accumulative resistor action, or so as to function as an adjustable voltage divider.

From the foregoing disclosure it is seen that I have provided an extremely simple and yet very effective variable resistor that allows exact values to be obtained with an infinitely fine variation while of course the resistor is free from contact troubles and is simple and economical to make without sacrifice of its precision qualities. The plastic materials mentioned herein whether metals or non-metals, will of themselves retain a set deformed position when forced into their plastic range, this range being beyond the usually relatively low elastic limit, if any, of such materials. If any of these materials tend to return a limited amount after release of the deforming force, yet this return is negligible in the operation of my improved resistor because the major portion of the deformation is retained by the material even after the deforming force is removed. This deforming force may be created by levers, screws, etc. in place of the means shown herein. Temperature compensation means as disclosed in my Patent 2,350,972 may be employed where high precision is desired.

It will of course be understood that various changes in details of construction and arrangement of parts may be made by those skilled in the art without departing from the spirit of the invention as set forth in the appended claims.

I claim:

1. A variable resistor comprising, in combination, a plastic member formed of material subject substantially entirely to plastic deformation upon application of an external force thereto, and electrical impedance means secured to said member and whose impedance is subject to change upon deformation of said member, whereby said member when deformed by said force to a desired extent for producing a given change of impedance will of itself without the external force and solely by reason of its plastic deformation retain a permanent set deformed position substantially identical to that which was obtained by application of said force and thereby hold the impedance change which was brought about by said force.

2. A variable resistor comprising, in combination, a plastic member formed of material subject substantially entirely to plastic deformation upon application of an external force thereto, and a wire whose electrical resistance varies with strain bonded throughout its effective length to said member, whereby said member when deformed by said force to a desired extent for producing a given change of resistance of the bonded wire will of itself without the external force and solely by reason of its plastic deformation retain a permanent set deformed position substantially identical to that which was obtained by application of said force and thereby hold the resistance change which was brought about by said force.

3. The combination set forth in claim 2 further characterized in that said member is arranged so as to be subject to bending strains when deformed.

4. The combination set forth in claim 2 further characterized in that said member is a cantilever and the gages extend lengthwise thereof whereby the member may be bent to effect the necessary resistance change.

5. A variable resistor comprising, in combination, a plastic member formed of material subject to plastic deformation upon application of an external force thereto, a wire whose electrical resistance varies with strain bonded throughout its effective length to said member, whereby said member when deformed by said force to a desired extent for producing a given change of resistance of the bonded wire will retain a permanent set deformed position and thereby hold the resistance change, said member being shaped to provide an endless surface on which the wire is bonded, and a tapered element extending into said member to expand the same upon application of an external force to move the element in the direction of its taper whereby upon deformation of the member the surface thereof is changed to vary the resistance of the wire.

6. The combination set forth in claim 2 further characterized in that said member is a loop whose shape is adapted to be deformed to effect the necessary resistance change.

7. The combination set forth in claim 2 further characterized in that said member is arranged so as to be subjected to torsional strains and the gages are positioned on the member in a direction so as to respond to such torsional strain.

8. The combination set forth in claim 2 further characterized in that said member is arranged so as to be subjected to direct axial strains.

9. The combination set forth in claim 2 further characterized in that the member has an axially extending portion terminating in a free end upon which a force is adapted to be applied to compress the material and accordingly effect a change in resistance.

10. A variable resistor comprising, in combination, a plastic member formed of material subject to plastic deformation upon application of an external force thereto, a wire whose electrical resistance varies with strain bonded throughout its effective length to said member, whereby said member when deformed by said force to a desired extent for producing a given change of resistance of the bonded wire will retain a permanent set deformed position and thereby hold the resistance change, said member being shaped to provide an endless surface on which the wire is bonded, and a tapered screw threaded into said member to expand the same upon application of an external rotational force applied to said screw whereby upon deformation of the member the surface thereof is changed to vary the resistance of the wire.

ARTHUR C. RUGE.